US010262624B2

(12) United States Patent
Morein et al.

(10) Patent No.: US 10,262,624 B2
(45) Date of Patent: Apr. 16, 2019

(54) SEPARATING A COMPRESSED STREAM INTO MULTIPLE STREAMS

(71) Applicant: Synaptics Incorporated, San Jose, CA (US)

(72) Inventors: Stephen L. Morein, San Jose, CA (US); Jeffrey Lukanc, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 60 days.

(21) Appl. No.: 14/584,976

(22) Filed: Dec. 29, 2014

(65) Prior Publication Data

US 2016/0189666 A1 Jun. 30, 2016

(51) Int. Cl.
*G09G 5/36* (2006.01)
*G09G 5/00* (2006.01)
(Continued)

(52) U.S. Cl.
CPC .......... *G09G 5/006* (2013.01); *G09G 3/2092* (2013.01); *G09G 3/2096* (2013.01); *G09G 5/18* (2013.01);
(Continued)

(58) Field of Classification Search
CPC .. H04N 19/12; H04N 19/70; G09G 2330/021; G09G 2340/02; G09G 3/36; G09G 3/2096; G09G 3/2092; G06F 12/023; G06F 3/0412; G06F 15/8061; G06F 9/3836; G06F 15/8015; G06F 9/3802; G06F 13/16; G06F 9/45558; G11C 11/005; G11C 13/0004; B41J 3/44; B41J 3/543; H04L 25/0272; H01L 27/0203; H01L 27/11521; G06T 7/13
(Continued)

(56) References Cited

U.S. PATENT DOCUMENTS 5,977,994 A * 11/1999 Greenberg .......... G06F 13/4027 345/441
8,732,496 B2 5/2014 Wyatt
(Continued)

OTHER PUBLICATIONS

VESA Display Stream Compression (DSC) Standard VESA: Video Electronics Standards Association, Version 1.1, Aug. 1, 2014, pp. 1-125, Video Electronics Standards Association, Newark, United States.

*Primary Examiner* — Barry Drennan
*Assistant Examiner* — Kwang B Lee
(74) *Attorney, Agent, or Firm* — Patterson + Sheridan, LLP

(57) ABSTRACT

Embodiments of the invention generally provide a display device that includes a controller that is communicatively coupled between a display source and source drivers. The controller and source drivers include respective decompression engines that can decompress the compressed data received from the display source. Instead of sending all of the compressed data to the source drivers, the controller evaluates the uncompressed data and identifies what portion of the compressed data corresponds to each of the source drivers. Moreover, the controller may determine a decompression engine state that corresponds to each portion of the compressed data. The saved engine state is transmitted to the source drivers which then initialize their decompression engines using the engine states.

20 Claims, 7 Drawing Sheets

(51) Int. Cl.
*G09G 5/18* (2006.01)
*G09G 3/20* (2006.01)

(52) U.S. Cl.
CPC . *G09G 2300/026* (2013.01); *G09G 2310/027* (2013.01); *G09G 2310/0281* (2013.01); *G09G 2340/02* (2013.01)

(58) Field of Classification Search
USPC .......................................................... 345/555
See application file for complete search history.

(56) References Cited

U.S. PATENT DOCUMENTS

| | | | | | |
|---|---|---|---|---|---|
| 2007/0280357 | A1* | 12/2007 | Sung | H04N 21/4122 | 375/240.25 |
| 2008/0143695 | A1 | 6/2008 | Juenemann et al. | | |
| 2009/0161971 | A1* | 6/2009 | Nogawa | H04N 21/4122 | 382/232 |
| 2011/0093568 | A1 | 4/2011 | Thomas | | |
| 2012/0120083 | A1 | 5/2012 | Kong et al. | | |
| 2012/0207208 | A1 | 8/2012 | Wyatt et al. | | |
| 2012/0236013 | A1 | 9/2012 | Wyatt et al. | | |
| 2013/0021352 | A1 | 1/2013 | Wyatt et al. | | |
| 2013/0188708 | A1* | 7/2013 | Rusert | H04N 19/597 | 375/240.12 |
| 2013/0235055 | A1 | 9/2013 | Kim et al. | | |
| 2013/0307835 | A1 | 11/2013 | Wu et al. | | |
| 2014/0049533 | A1* | 2/2014 | Saitoh | G09G 3/20 | 345/213 |
| 2015/0049097 | A1* | 2/2015 | Ju | G09G 5/006 | 345/520 |
| 2015/0062107 | A1* | 3/2015 | Kim | G09G 3/20 | 345/212 |
| 2015/0325184 | A1* | 11/2015 | Hsiao | G09G 3/3611 | 345/204 |

* cited by examiner

SEPARATING A COMPRESSED STREAM INTO MULTIPLE STREAMS

FIELD OF THE INVENTION

This invention generally relates to updating a display, and more specifically, to transmitting compressed data to source drivers for updating the display.

BACKGROUND OF THE INVENTION

Display devices for updating images on a display screen are widely used in a variety of electronic systems. A typical display device includes a source that provides display data that is used to update the screen. The display data may be organized into display frames which are transmitted from the source to the display screen at a predefined rate. In one example, each display frame corresponds to an image to be displayed on the screen. The display screen may include display drivers that update the individual pixels on the display screen using the received display frames. The pixels in the display screen are typically assigned to one of the source drivers—e.g., the pixels in columns 1-5 are assigned to Source Driver 1, the pixels in columns 6-10 are assigned to Source Driver 2, and so forth.

BRIEF SUMMARY OF THE INVENTION

One embodiment described herein includes a method that decompresses compressed data to identify first data for a first source driver of the display device and second data for a second source driver of the display device where the compressed data including at least a portion of a display frame for a display device. The method also includes identifying a first decompression engine state corresponding to the first data and a second decompression engine state corresponding to the second data. The method includes transmitting a first stream comprising the first data and the first decompression engine state to the first source driver and transmitting a second stream comprising the second data and the second decompression engine state to the second source driver.

Another embodiment described herein includes a timing controller with a storage element configured to receive compressed data including at least one display frame for a display device and a decompression engine. The decompression engine is configured to decompress the received compressed data to identify first data for a first source driver of the display device and second data corresponding to a second source driver of the display device and identify a first decompression engine state corresponding to the first data and a second decompression engine state corresponding to the second data. The timing controller includes control logic configured to transmit a first stream comprising the first data and the first compression engine state to the first source driver and transmit a second stream comprising the second data and the second compression engine state to the second source driver.

Another embodiment described herein includes a display device with first and second source drivers for updating a display screen and one or more electrical connections. The display device also includes a timing controller coupled to the first and second source drivers via the one or more electrical connections. The timing controller includes a storage element configured to receive compressed data including at least one display frame for a display device and a decompression engine. The decompression engine is configured to decompress the received compressed data to identify first data for a first source driver of the display device and second data corresponding to a second source driver of the display device and identify a first decompression engine state corresponding to the first data and a second decompression engine state corresponding to the second data. The timing controller also includes control logic configured to transmit a first stream comprising the first data and the first compression engine state to the first source driver and transmit a second stream comprising the second data and the second compression engine state to the second source driver.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

Figure 1:
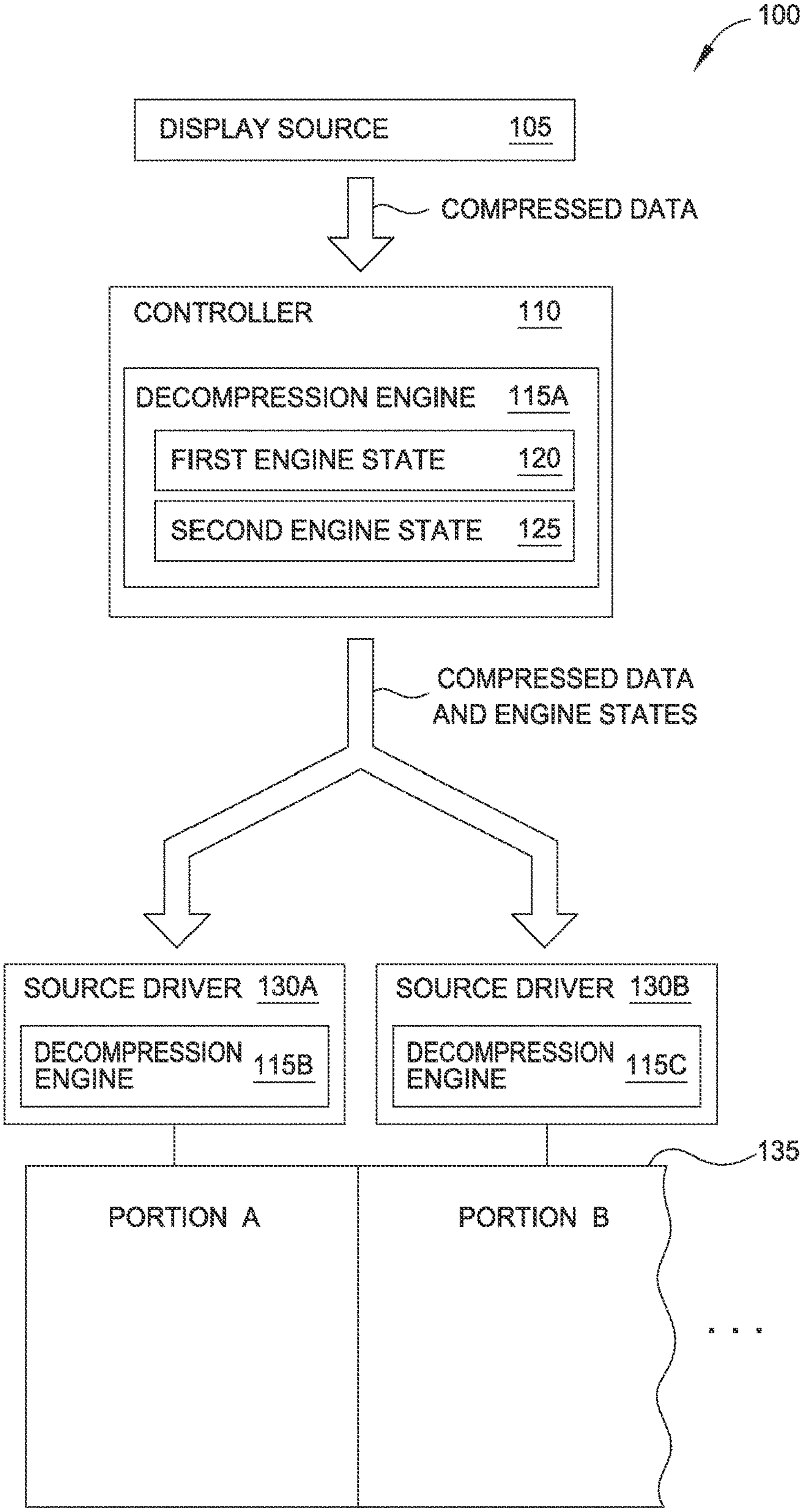
FIG. 1 is a block diagram of a display device for transmitting compressed data to source drivers in accordance with an embodiment of the invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide display devices and methods that facilitate improved usability. In a display device, source drivers use received display frames to update the pixels in a display. For example, the display device may include a display source, such as a graphic processing unit, that compresses the display frames and transmits this compressed data to the source drivers which decompress the data and update the pixels. In one embodiment, the source drivers are assigned different portions of a display screen. For example, for a particular line update, the pixels in a first portion of the line are assigned to a first source driver, the pixels in the subsequent portion of the line are assigned to a second source driver, and so forth. As such, each source driver needs to receive only the compressed data that corresponds to the pixels assigned to it.

In one embodiment, the display device includes a controller (e.g., a timing controller or display controller) that is communicatively coupled between the display source and the source drivers. Like the source drivers, the controller also includes a decompression engine that can decompress the compressed data received from the display source. Instead of sending all of the compressed data to the source drivers, the controller evaluates the uncompressed data and identifies what portion of the compressed data corresponds to each of the source drivers. Using this information, the controller transmits only the relevant portion of the compressed data to each of the source drivers rather than transmitting all of the compressed data to each source driver.

In addition to identifying which portion of the compressed data should be transmitted to which source driver, the controller may determine a decompression engine state that corresponds to each portion of the compressed data. Stated differently, as the decompression engine on the controller decompresses the data, the controller saves the current state of the decompression engine when the controller identifies a portion of the compressed data that should be sent to a different source driver. For example, the decompression engine may currently be decompressing data that corresponds to Source Driver A, but once the engine begins decompressing data that corresponds to Source Driver B, the controller saves the current state of the decompression engine. This saved engine state (along with the portion of the compressed data corresponding Source Driver B) is transmitted to Source Driver B which then initializes its decompression engine using the engine state. As used herein, a "decompression engine state" includes all the necessary parameters and data to configure or initialize a decompression engine to a particular state. Accordingly, once initialized with the saved decompression engine state, the decompression engine on Source Driver B has the same configuration (i.e., state) as the decompression engine on the controller when the engine state was saved. Doing so enables the decompression engine on Source Driver B to begin decompressing its portion of the compressed data as if the decompression engine already decompressed the previous portion (or portions) of the compressed data. In this manner, by transmitting the engine states of the decompression engine on the controller to the source drivers, the display device is able to initialize the different decompression engines on the source drivers without requiring these engines to decompress all the compressed data, thereby reducing the power consumed by the source drivers as well as reducing the bandwidth needed to communicate with the source drivers (since only a portion of the compressed data, rather than all the compressed data, is sent to each source driver).

In another embodiment, the controller does not decompress the compressed data received from the display source. In one example, the compressed data is transmitted from the display source without first being received by the controller which then relays the compressed data to the source drivers. In this embodiment, all of the compressed data is sent to each of the source drivers. However, instead of each source driver decompressing all of the compressed data, one of the source drivers begins to decompress the compressed data until this source driver identifies display data that is intended for a different source driver. The source driver then transmits its current decompression engine state to a different source driver along with an address that indicates the location of the compressed data intended for that source driver. The source driver that receives the engine state can then initialize its decompression engine and begin decompressing the compressed data at the provided address. This process may then repeat until all the compressed data has been decompressed by the source drivers. While this embodiment enables the source drivers to decompress only a portion of the compressed data, the bandwidth used to transmit the compressed data to the source driver is increased since all of the compressed data is sent to each of the source drivers rather than only a portion of the compressed data being sent to each source driver.

FIG. 1 is a block diagram of a display device 100 for transmitting compressed data to source drivers in accordance with an embodiment of the invention. The display device 100 may be configured to display information for an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the display device 100.

The display device 100 can be implemented as a physical part of the electronic system, or can be physically separate from the electronic system. As appropriate, the display device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

The display device 100 includes a display source 105, a controller 110, a plurality of source drivers 130, and a display 135. The display source 105 may be a graphics processing unit, a separate or integrated electronic system, and the like. The display source 105 transmits compressed data to the controller 110, which may reduce the bandwidth of the connection relative to sending uncompressed data. The compressed data may include at least a portion of a display frame which is used to by the source drivers (once the data is decompressed) to update the display 135. In one embodiment, the display frames are compressed using a visually lossless algorithm such that a user cannot visually tell a difference between an image on the display 135 that was outputted using a compressed display frame or an uncompressed display frame. One such suitable compression algorithm is the Display Stream Compression (DSC) standard. However, the embodiments herein are not limited to visually lossless compression algorithms and may be used with any compression algorithm that compresses the display frame data.

The controller 110 may be a timing controller, display controller, and the like. The controller 110 may be part of an integrated circuit or system on a chip. Moreover, the controller 110 on the same substrate as the display source 105 (e.g., mounted on the same PCB) or mounted on different substrates. The controller 110 includes a decompression engine 115A. In one embodiment, the decompression engine 115A decompresses the compressed data received from the display source 105 and identifies what portion of the compressed data is assigned to the source drivers 130. For example, the compressed data may include information for updating a line (e.g., a horizontal row) in the display 135.

However, the pixels in the first half of the line, which are in Portion A, are assigned to source driver 130A, while the pixels in the second half of the line, which are in Portion B, are assigned to source driver 130B. By decompressing the compressed data, the controller 110 determines whether the compressed data is intended for source driver 130A or source driver 130B (assuming only two source drivers in the display device 100). Instead of relaying all of the compressed data to the source drivers 130, the controller 110 relays the compressed data for the first half of the line to source driver 130A and the compressed data for the second half of the line to source driver 130B.

One advantage of transmitting compressed data rather than uncompressed data from the controller 110 and the source drivers 130 is that the bandwidth of the connections between the controller 110 and source drivers 130 is reduced. The bandwidth requirements are further reduced by sending only a portion of the compressed data to the source drivers 130—i.e., only the display data necessary for updating the pixels assigned to the source drivers 130. Many compression schemes, however, depend on information that was obtained when decompressing previous data in a data stream in order to decompress the current data in the data stream. That is, assuming a decompression engine receives a stream of compressed data, in order to decompress data in the middle of this stream, the decompression engine may need information that was obtained when decompressing the data at the beginning of the stream. Decompression schemes that use information obtained from decompressing previous portions of a compressed data stream to decompress later portions of the data stream are referred to herein as "dependent decompression." If a dependent decompression scheme is used, when the controller 110 transmits only a portion of the compressed data to the source drivers 130, decompression engines 115 on the source drivers 130 have not decompressed the previous portion of the compressed data, and thus, may lack the information necessary to decompress the received portion of the compressed data.

To handle this problem, when decompressing the compressed data, the decompression engine 115A on the controller 110 saves its state upon identifying a portion of the compressed data that is intended for one of the source drivers 130. For example, when the compression engine first identifies a portion of the compressed data intended for source driver 130A, the engine 115A saves its state (e.g., first engine state 120) which includes the necessary information obtained from decompressing the previous portions of the compressed data (if any). The controller 110 transmits the first engine state 120 to the source driver 130A which uses this state 120 to initialize decompression engine 115B such that it is now in the same state as the first engine state 120. Stated differently, the decompression engine 115B is initialized to the same state as was decompression engine 115A when the controller 110 identified a location in the compressed data that includes data for updating pixels assigned to source driver 130A. Once decompression engine 115B is initialized to the first engine state 120, the source driver 130A can decompress the received portion of the compressed data as if the decompression engine 115B had already decompressed the previous portions of the compressed data (which it did not).

Similarly, once the controller 110 indentifies a portion of the compressed data intended for source driver 130B (e.g., a second half of a line update), the controller 110 saves the current state of decompression engine 115A (e.g., second engine state 125) and transmits the second engine state 125 and the location of the portion of the compressed data that is intended for source driver 130B. For example, the second engine state 125 will include any information obtained when decompressing the first half of the line update as well as any previous portions of the compressed data. Thus, when source driver 130B initializes its decompression engine 115C using the second engine state 125, engine 115C is in the same state as decompression engine 115A when it finished decompressing the first half of the line update. The decompression engine 115C can then correctly decompress the second half of the line update and source driver 130B can update the pixels in Portion B according to the decompressed data.

In one embodiment, the controller 110 and each of the source drivers 130 are embodied in separate integrated circuits. Alternatively, the source drivers 130 may be included within a common integrated circuit. In one embodiment, the controller 110 and source drivers 130 may be mounted on a common substrate—e.g., a planar or flexible printed circuit board (PCB). The common substrate may also be attached to the display 135. Alternatively, the source drivers 130 may be fixed to the display 135 to form a unitary system while the controller 110 is mounted on a separate substrate.

The display 135 may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology.

Figure 2:
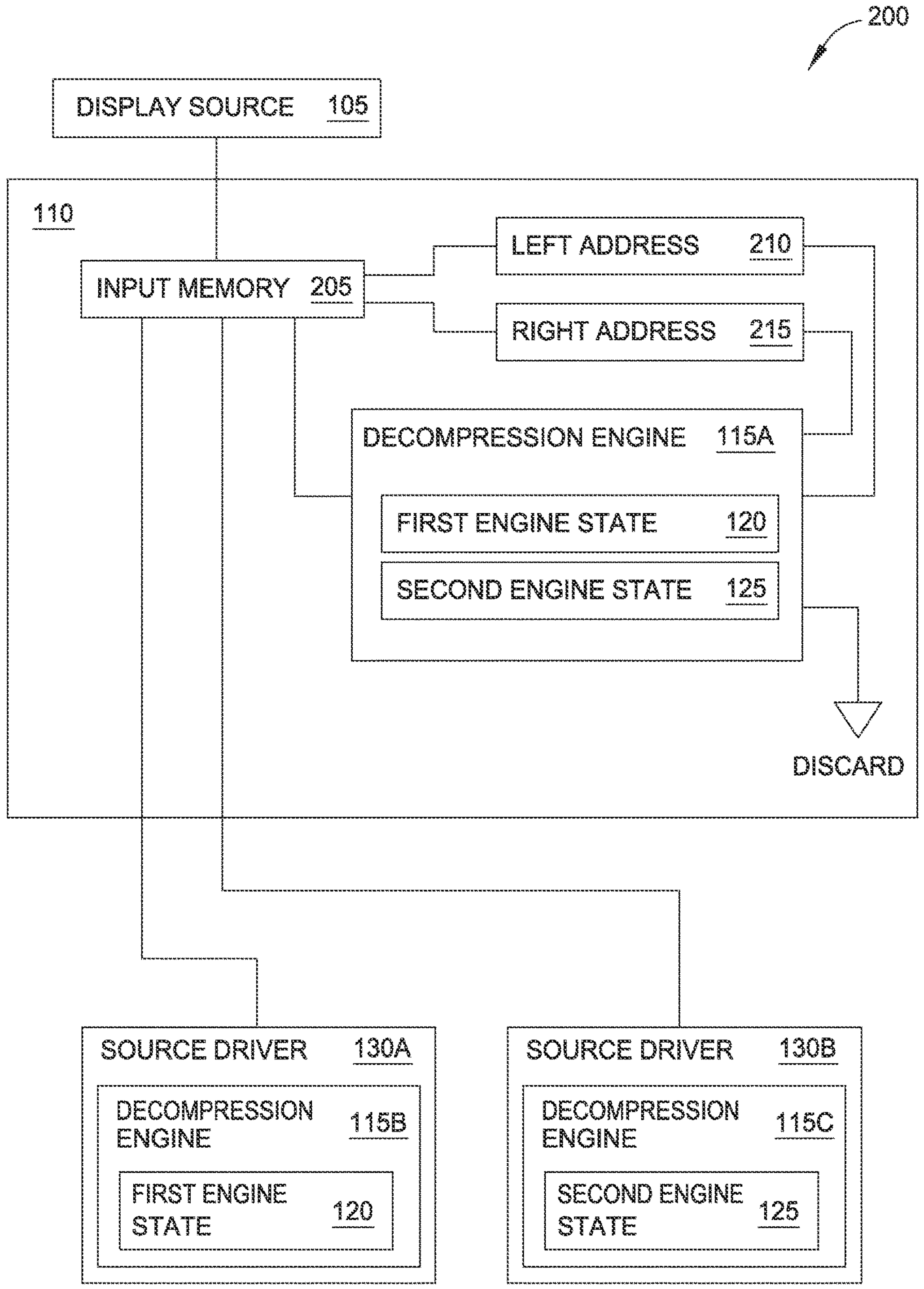
FIG. 2 is a block diagram of a display device for providing source drivers with decompression engine states in accordance with an embodiment of the invention.

FIG. 2 is a block diagram of a display device 200 for providing source drivers 130 with decompression engine states in accordance with an embodiment of the invention. Like in FIG. 1, display device 200 includes display source 105, controller 110, and source drivers 130 (the display has been omitted). However, in other embodiments, one or more of the elements in the display device 200 are part of another device (e.g., a host device) and are external to the display device 200.

In addition to including decompression engine 115A, controller 110 includes an input memory 205, left address register 210, and right address register 215. The input memory 205 receives the compressed data from the display source 105 and forwards the compressed data to the decompression engine 115A. Alternatively, the decompression engine may receive the compressed data directly from the display source 105. Instead of relaying the compressed data to each of the source drivers 130, as will be described in greater detail below, the controller 110 uses the decompression engine and the first and second (e.g., left and right) address registers 210, 215 to identify only a portion of the compressed data to send to the source drivers 130. For example, assuming the source drivers 130A and 130B are each assigned half of the pixels on the display, half of the compressed data is forwarded to source driver 130A while the other half is forwarded to source driver 130B. By first decompressing the data using engine 115A, the controller 110 determines which half should be transmitted to which source driver 130.

Figure 3:
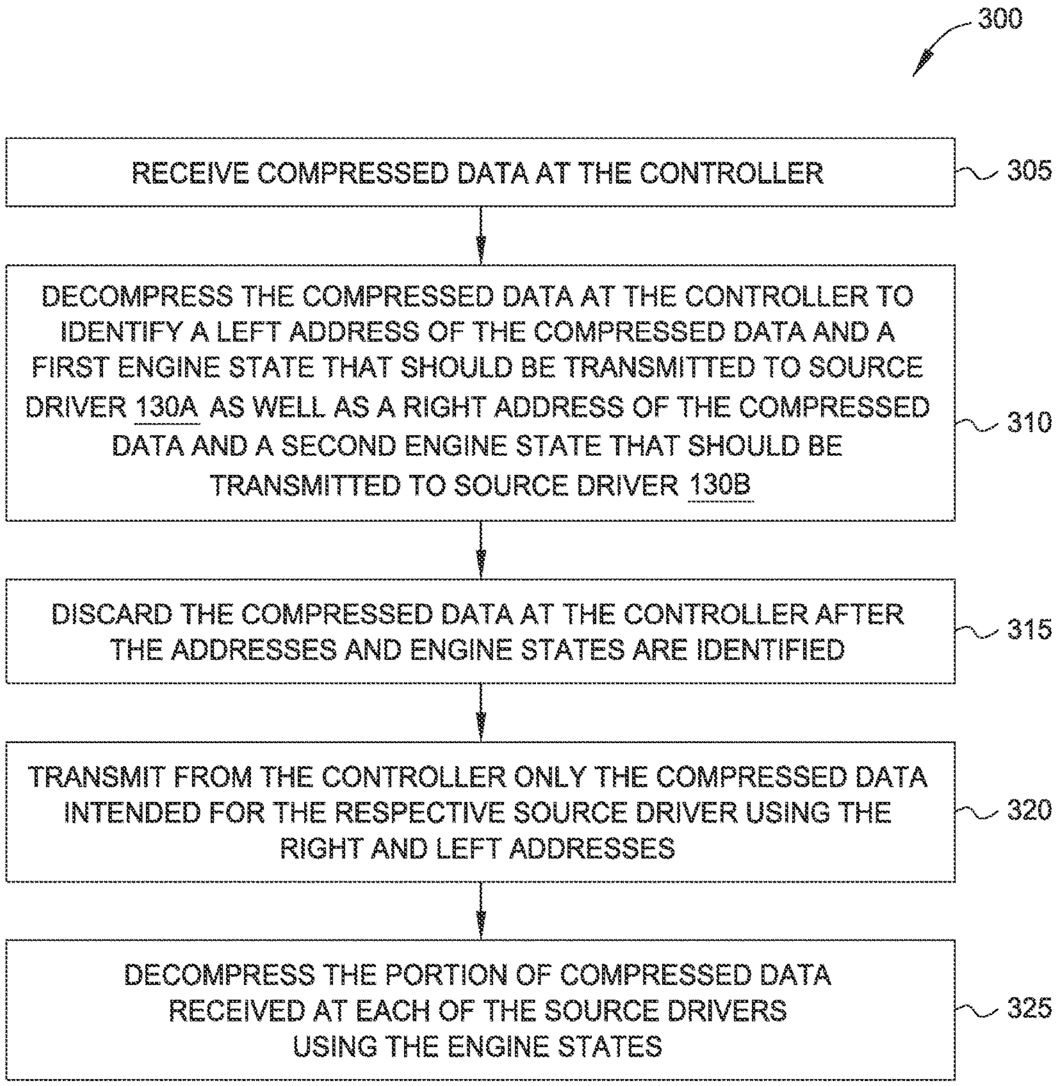
FIG. 3 is a method for providing source drivers with decompression engine states in accordance with an embodiment of the invention.

FIG. 3 is a method 300 for providing source drivers with decompression engine states in accordance with an embodiment of the invention. Specifically, the method 300 describes a technique for operating the display device 200 shown in FIG. 2. Although FIG. 2 illustrates two source drivers 130, the display device 200 may have any number of source drivers 130 which may be tasked with updating equal or unequal shares of the display. At block 305, the controller receives compressed data from the display source which includes display data for updating a display frame on the device. For example, the compressed data may include a plurality of line updates that correspond to the number of display lines (or rows) in the display. The compressed data includes data for updating the pixels within the lines. As described above, the pixels within the lines may be assigned to different source drivers which use source lines (e.g., vertical electrodes) extending through the display to update the pixels.

At block 310, the decompression engine on the controller decompresses the compressed data transmitted by the display source. As the data is decompressed, the controller evaluates the data to determine which source driver should receive the compressed data. For example, the controller may evaluate the location of the pixels in the decompressed data and determine which source driver is tasked with updating those pixels. Regardless how the controller evaluates the decompressed data, once a portion of the compressed data intended for a specific source driver is identified, the controller saves the starting address of the portion of the compressed data to a register. Referring back to FIG. 2, the display device includes two source drivers 130 and two registers 210, 215 for storing addresses for portions of the compressed data corresponding to the source drivers 130. For example, once the controller 110 determines the decompressed data is for a new line in the display, the controller 110 stores the starting location of the new line in the compressed data to the left address register 210 which corresponds to source driver 130A. As the decompression engine 115A continues to decompress data for the line, eventually control logic in the controller 110 identifies decompressed data for updating pixels on the second half of the line which are assigned to source driver 130B. In response, the control logic stores the corresponding address of the compressed data containing display data for the second half of the line in the right address register 215.

Referring back to the method 300, in addition to identifying the addresses of the compressed data that correspond to the source drivers, the controller also saves the states of the decompression engine corresponding to the locations stored in the left and right address registers. Continuing the example above, once the controller determines the compressed data is for a new line in the display, the controller saves the current state of the engine as the first engine state. Once the controller determines the compressed data is for the second half of the line, the controller saves the current state of the decompression engine as the second engine state. These engine states contain all the necessary information for initializing a decompression engine on the source drivers to be in the same state the decompression engine on the controller was in when the engine begin decompressing data at the addresses saved in the left and right registers.

At block 315, after identifying the right or left addresses and the corresponding engine states for the portions of the compressed data, the decompression engine on the controller discards the decompressed data. Stated differently, the decompressed data is deleted from the memory elements in the controller since the controller relays the compressed data, and not the decompressed data, to the source drivers.

At block 320, the controller transmits to the source drivers only the portions of the compressed data intended for the individual source drivers. For example, the compressed data for the first half of a line update is sent to source driver 130A while the compressed data for the second half of the line update is sent to source driver 130B. To do so, the left and right addresses are used to index into the input memory to identify the portion of the compressed data that should be sent to the source drivers. Because the controller may determine the amount of compressed data for the first half of the line update (or the amount of data is constant), input memory uses the left address to identify a start location of the compressed data and transmits only the compressed data for the first half of the line update to the source driver 130A. For example, if the amount of compressed data for a half of the line update is 50 bytes, the controller transmits, starting at the left address, the next 50 bytes of the compressed data. Similarly, once the controller identifies compressed data for the second half of the line update, the controller transmits this portion of the compressed data to source driver 130B using the right address. As used herein, 50 bytes is used for illustratively purposes only and the data for half of the line update can be more or less than this amount.

By sending compressed data, the bandwidth of the connection between the controller and the source drivers is reduced. This bandwidth is further reduced since the controller decompresses the data to determine which portions of the compressed data should be sent to which source driver.

In one embodiment, the decompression engine on the controller operates faster than the decompression engines on the source drivers. For example, the decompression engine on the controller may operate two times, or three times faster than the decompression engines on the source drivers. As a result, the decompression engine on the controller is able to decompress and evaluate the data to identify the left and right addresses and the first and second engine states faster than the decompression engines on the source drivers can decompress the data. Assuming the decompression engine on the controller can operate at least twice as fast as the engines on the source drivers, once the controller identifies a new line in the compressed data, it can send the corresponding portion to source driver 130A (e.g., the compressed data corresponding to the first half of the line update). While the decompression engine on source driver 130A is decompressing its portion, the controller then identifies the second half of the line update and transmits this portion of the compressed data to source driver 130B which begins to decompress the data. Because the controller is operating at twice the speed, source driver 130A is still decompressing the first half of the line update when source driver 130B receives the compressed data for the second half of the line update. Thus, the decompression engines on the source drivers can operate in parallel. Because the controller sends the engine states to the source drivers, the source drivers can simultaneously decompress different portions of the same line update.

In embodiments where the display device may include additional source drivers (e.g., six source drivers), the decompression engine on the controller can operate at, for example, five or six times faster than the decompression engines on the source drivers, and thus, the source drivers may be decompressing data associated with different portions of the same line update in parallel—e.g., the first source driver is decompressing the first one-sixth portion of the line update while the second source driver is decompressing the second one-sixth portion of the line update, while the third source driver is decompressing the third one-sixth portion of the line update, and so forth.

At block 325, the source drivers initialize their decompression engines using the engine states received from the controller and begin to decompress the received portions of the compressed data. By so doing, the decompression engines of the source drivers have the necessary information and configuration to decompress the compress data and update the pixels assigned to the source drivers. Although the compressed data is decompressed twice—once by the decompression engine on the controller and once by the decompression engines on the source drivers—the advantage of doing so is the controller can send only the compressed data that is intended for the specific source driver rather than sending all the compressed data to each of the source drivers.

The method 300 then repeats as the decompression engine on the controller continues to decompress the compressed data. That is, the controller evaluates the decompressed data and identifies a different line update (e.g., a second line in the display) and updates the left address and saves the current engine state of the decompression engine. The portion of the compressed data corresponding to the first half of the second line update along with the saved engine state are transmitted to the source driver 130A which begins decompressing the compressed data portion (assuming its finished decompressing the previously received portion).

Figure 4:
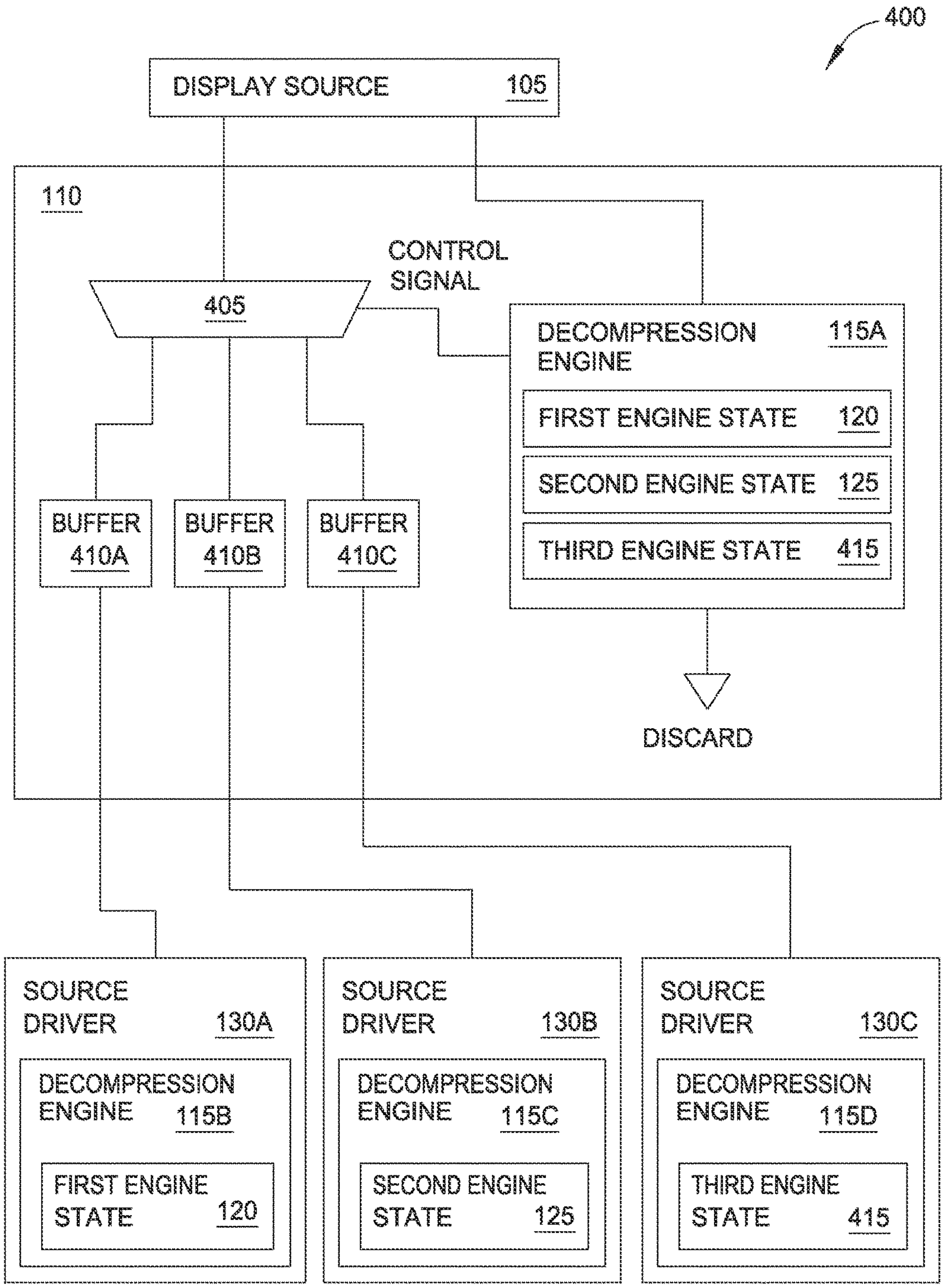
FIG. 4 is a block diagram of a display device for providing source drivers with decompression engine states in accordance with an embodiment of the invention.

FIG. 4 is a block diagram of a display device 400 for providing source drivers with decompression engine states in accordance with an embodiment of the invention. Here, unlike display device 200 shown in FIG. 2, display device 400 includes a controller 110 where the compressed data is stored in buffers 410 that correspond to different source drivers 130. That is, instead of the compressed data being store in a shared memory (e.g., input memory 205), control logic in the decompression engine 115A provides a control signal for a multiplexer 405 (or any other switching element) that routes a portion of the compressed data intended for the specific source driver 130 into the corresponding buffer 410. Moreover, display device 400 includes three source drivers 130 that each updates a third of the pixels of the display, however, the display device 400 may include any number of source drivers 130. For a given line update, source driver 130A updates the first one-third of the pixels on the line, source driver 130B updates the middle one-third of the pixels, and source driver 130C updates the last one-third of the pixels. In one embodiment, the source drivers 130 may be tasked with updating a different number of pixels on the lines, and as such, the source drivers 130 may receive different portions of the display update data. For example, source driver 130A and 130B may each update two-fifths of the pixels in a line, while source driver 130C updates the remaining one-fifth of the pixels. As a result, source driver 130C may receive less compressed data (since it has to update half of the number pixels) as the other two source drivers 130A and 130B.

Like the display device 200 shown in FIG. 2, display device 400 uses the decompression engine 115A to decompress the compressed data and identify the portions of the compressed data intended for the individual source drivers 130 and the engine states corresponding to those portions. Although FIG. 4 illustrates only one saved engine state per source driver 130, the drivers 130 may store multiple different engine states that correspond to different portions of the compressed data.

Figure 5:
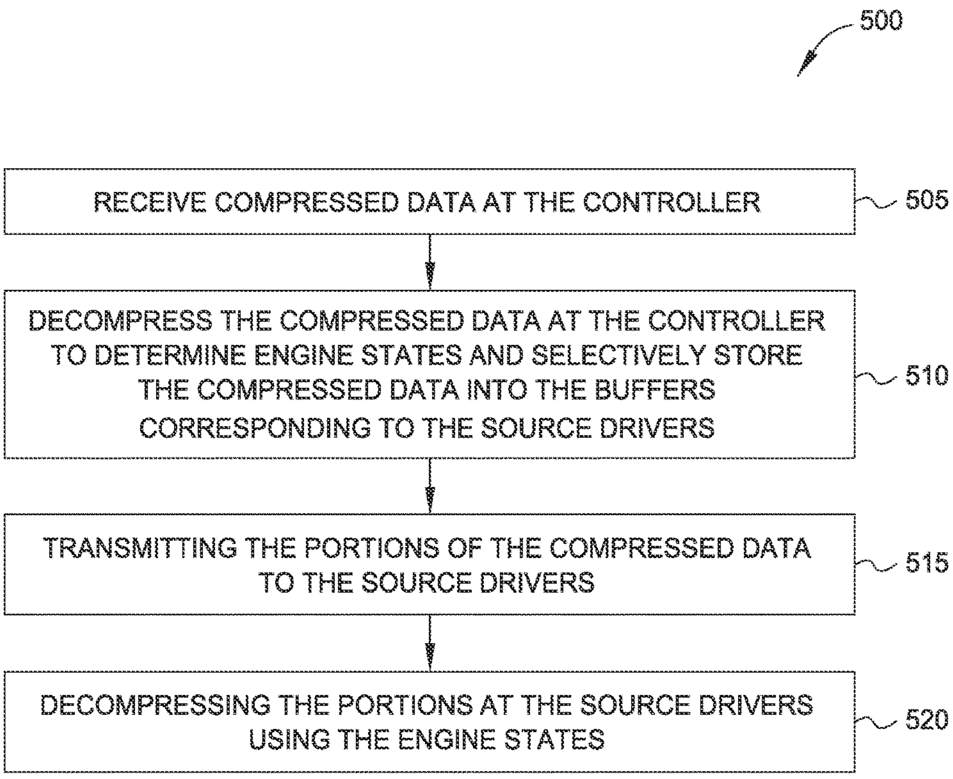
FIG. 5 is a method for providing source drivers with decompression engine states in accordance with an embodiment of the invention.

FIG. 5 is a method 500 for providing source drivers with decompression engine states in accordance with an embodiment of the invention. Specifically, the method 500 describes a technique for operating the display device 400 shown in FIG. 4. At block 505, the controller receives compressed data from the display source which includes display data for updating a display frame on the device—e.g., a plurality of line updates that correspond to the number of display lines (or rows) in the display.

At block 510, the decompression engine on the controller decompresses the compressed data transmitted by the display source. As the data is decompressed, the controller evaluates the data to determine which source driver should receive the compressed data. Once a portion of the compressed data intended for a specific source driver is identified, control logic in the controller uses the control signal to route the portion of the compressed data to the buffer corresponding to the source driver. Referring back to FIG. 4, the display device 400 includes three source drivers 130 and uses the three buffers—i.e., buffers 410A, 410B, and 410C—for storing the portions of the compressed data for the source drivers 130. For example, once the controller 110 determines the decompressed data is for a new line in the display, the controller 110 changes the control signal for the multiplexer 405 such that the compressed data currently being received is routed to buffer 410A. As the decompression engine 115A continues to decompress the data, eventually the controller 110 identifies decompressed data for updating pixels on the middle one-third of the line which are assigned to source driver 130B. In response, the controller 110 updates the control signal such that the compressed data is routed to buffer 410B. Once the decompression engine 115A identifies the last one-third of the line, the engine changes the control signal so the multiplexer 405 routes the compressed data into buffer 410C.

In addition to updating the control signal, the controller 110 also saves the current state of the decompression engine 115A corresponding to the portions of the compressed data stored in the buffers 410. For example, the first engine state 120 includes the configuration data needed to decompress the data portion stored in buffer 410A, the second engine state 125 includes the configuration data needed to decompress the data portion stored in buffer 410B, and the third engine state 415 includes the configuration data needed to decompress the data portion stored in buffer 410C.

Returning to the method 500, at block 515, the buffers transmit the stored data portions to the source drivers. Because a third of the compressed data is stored in the buffers, the data connections between the controller and the individual source drivers uses a third of the bandwidth relative to the bandwidth of the data connection between the display source and the controller. In addition to transmitting the portions of the compressed data to the source drivers, the controller also transmits the saved engine states corresponding to these portions to the source drivers. The engine states may be saved in the buffers along with the compressed data or the controller may use a separate data connection to transmit the engine states to the source drivers.

As discussed above, in one embodiment, the decompression engine on the controller operates faster than the decompression engines on the source drivers. As a result, the decompression engine on the controller is able to decompress and evaluate the data to selectively store the compressed data in the buffers faster than the decompression engines on source drivers can decompress the data. Referring back to FIG. 4, assuming the data connection between the controller 110 and each source driver 130 has only a third of the bandwidth as the data connection between the display source 105 and controller 110, the buffers 410 may be transmitting portions of the compressed data in parallel. For example, assuming the decompression engine 115A can decompress the compressed data at the rate it is received, the controller 110 can store the compressed data in the buffers 410 that is three times faster than the data can be transmitted to, and decompressed by, the source drivers 130. Therefore, source driver 130A may be decompressing data for the first one-third of a display line at the same time source driver 130B is decompressing data for the middle one-third of the display line.

At block 520, the source drivers initialize their decompression engines using the engine states received from the controller and begin to decompress the received portions of the compressed data. By so doing, the decompression engines of the source drivers have the necessary information and configuration to decompress the compressed data and update the pixels assigned to the source drivers.

Figure 6:
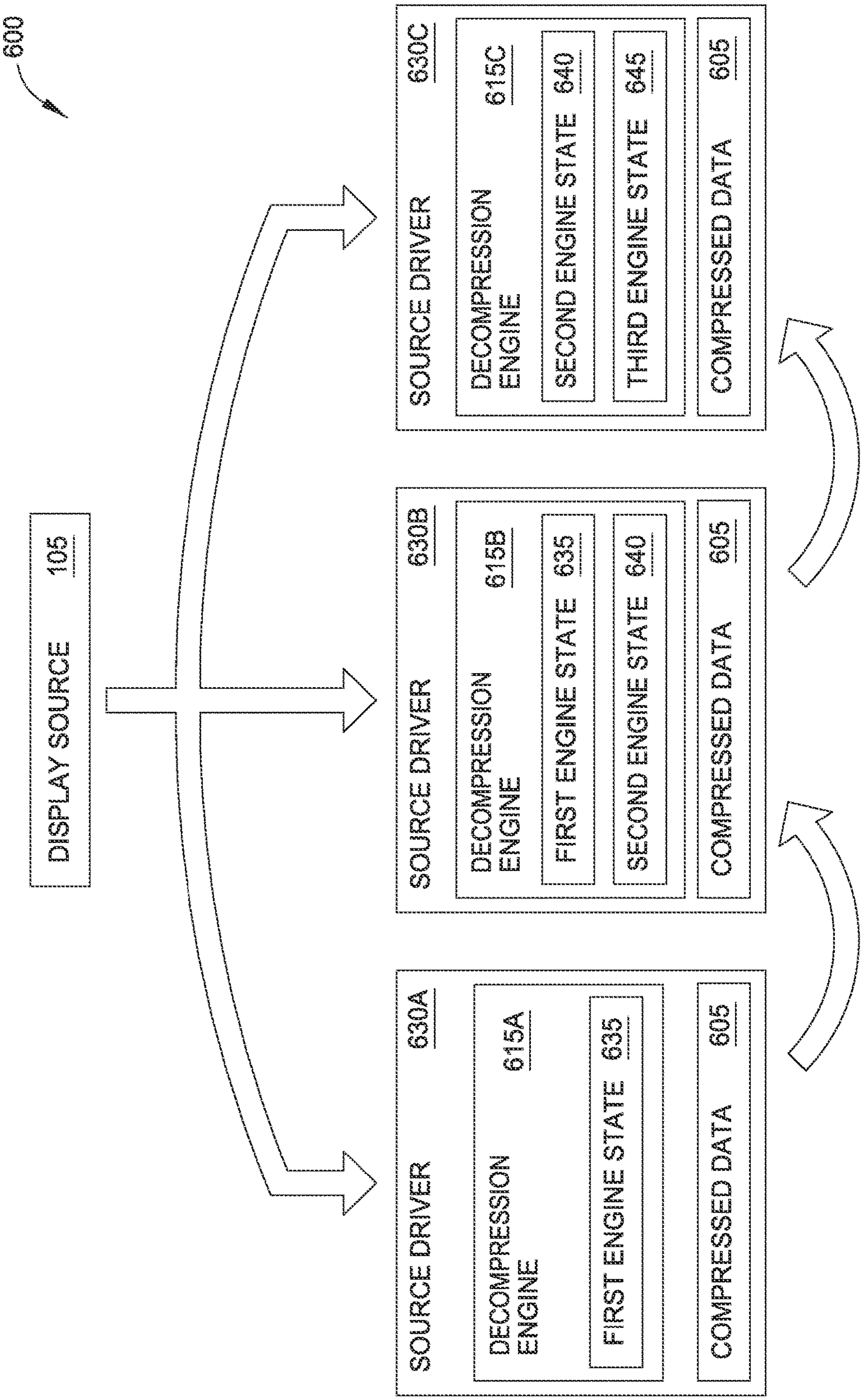
FIG. 6 is a block diagram of a display device for sharing decompression engine states among the source drivers in accordance with an embodiment of the invention.

FIG. 6 is a block diagram of a display device 600 for sharing decompression engine states among the source drivers 630 in accordance with an embodiment of the invention. Unlike the display devices illustrated in FIGS. 2 and 4, display device 600 does not include a controller 110. In one embodiment, the display source 105 includes a direct connection to the source drivers 630. Alternatively, the display device 600 may include a controller that receives the data from the display source 105 and relays the compressed data 605 to the source drivers 630, but the controller does not decompress the data. That is, the controller forwards the compressed data 605 to the source drivers 630 without evaluating the data to determine which data portions are intended for which source driver 630. In either case, in this embodiment each source driver 630 receives all of the compressed data 605 rather than receiving only a portion of the compressed data 605 as done in the embodiments above.

The source drivers 630 each include a decompression engine 615 and a copy of the compressed data 605. Moreover, the source drivers 630 include data connections to a neighboring or adjacent source driver. As shown, source driver 630A includes a data connection to source driver 630B which has a data connection to source driver 630C. Assuming there are no other source drivers in the display device 600, source driver 630C includes a data connection to source driver 630A. However, if there are additional source drivers, source driver 630C would include a data connection to the next source driver. The last source driver would then have a data connection back to source driver 630A.

In one embodiment, source drivers 630 use the data connections to share engine states so that the decompression engines 615 on each of the source drivers 630 do not need to decompress all of the compressed data 605. For example, source driver 630A begins to decompress the compressed data 605 until the driver 630A determines that the decompressed data is for updating pixels that are not assigned to it. As will be described in more detail in FIG. 7, the source driver 630A saves its current engine state (i.e., first engine state 635) and transmits that state 635 to source driver 630B. Source driver 630A may also provide a starting address of the compressed data that corresponds to the first engine state 635. Source driver 630B initializes its decompression engine 615B using the first engine state 635 and begins decompressing the compressed data 605 at the address provided by source driver 630A until the source driver 630B indentifies display data for pixels assigned to source driver 630C. This process can then repeat.

Figure 7:
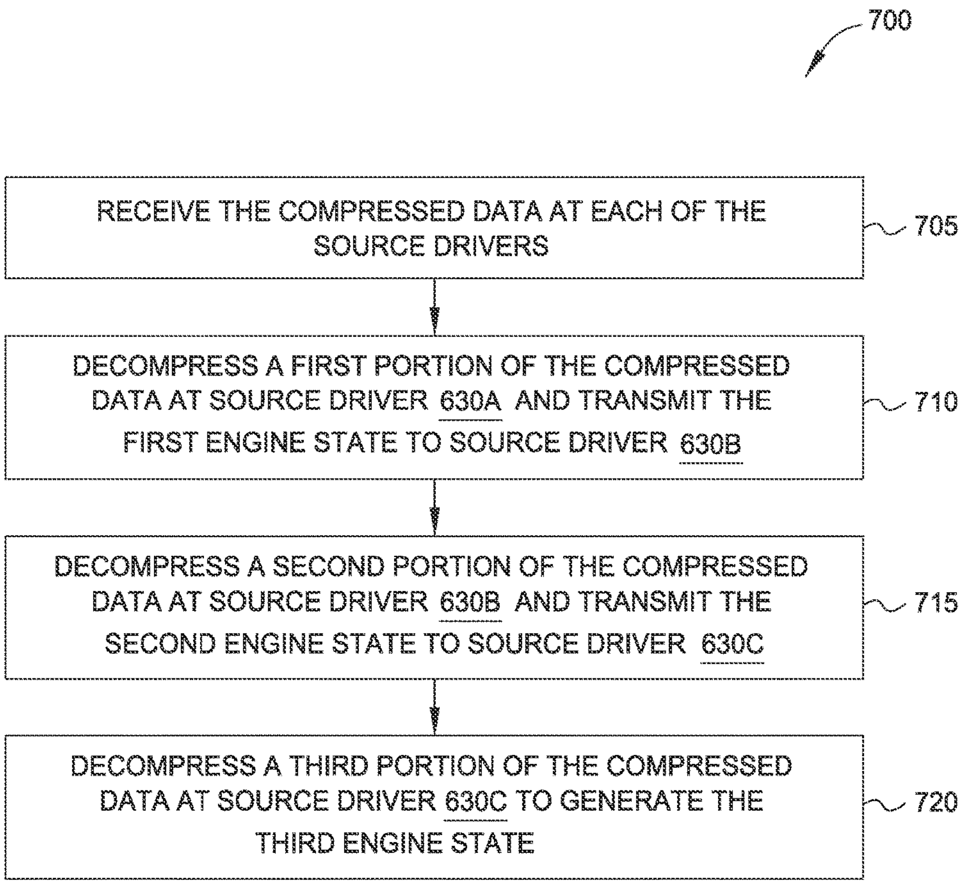
FIG. 7 is a method for sharing decompression engine states among the source drivers in accordance with an embodiment of the invention.

FIG. 7 is a method 700 for sharing decompression engine states among the source drivers in accordance with an embodiment of the invention. Specifically, the method 700 describes a technique for operating the display device 600 shown in FIG. 6. At block 705, each source driver begins to receive the compressed data from the display source which includes display data for updating a display frame on the device—e.g., a plurality of line updates that correspond to the number of display lines (or rows) in the display.

At block 710, one of the source drivers (e.g., the source driver assigned to update pixels at the leftmost portion of the display line) decompresses the first portion of the compressed data. To determine which source driver should start decompressing the compressed data, each of the source drivers may begin to decompress the data but only the source driver that updates the leftmost portion of the display continues to decompress the compressed data. The other source drivers stop decompressing the data once they determine the data is for updating pixels that are not assigned to them.

Once the leftmost source driver identifies data intended for a different source driver, the source driver saves the current state of its decompression engine along with a corresponding address in the compressed data. Using one of the data connections illustrated in FIG. 6, the source driver transmits the saved engine state and the corresponding address to a second source driver.

At block 715, the second source driver initializes its decompression engine using the received engine state. By so doing, its decompression engine is configured as if it decompressed the first portion of the compressed data even though it was idle during this time. The second source driver uses the address to identify the correct starting location of the second portion of the compressed data and begins to decompress the data. Upon identifying display data in the compressed data that is intended for a third source driver, the second source driver saves the current state of its decompression engine along with the corresponding address in the compressed data. The second source driver then transmits the saved engine state and the corresponding address to the third source driver.

At block 720, the third source driver initializes its decompression engine using the received engine state and begins to decompress a third portion of the compressed data at the address received from the second source driver. If there are only three source drivers in the display devices, upon identifying display data in the compressed data that is for a new line (i.e., the data is intended for the first source driver), the third source driver saves the current state of its decompression engine along with the corresponding address in the compressed data and transmits this information to the first source driver where the method 700 can repeat until all the compressed data has been decompressed and used by the three source drivers to update the pixels in the display.

In the method 700, the source drivers wait for the previous source driver to decompress the compressed data and provide the appropriate decompression engine state which means the data is processed sequentially. However, in the method 300 and 500 in FIGS. 3 and 5, because the decompression engine on the controller may operate much faster than the decompression engines on the source drivers, the source drivers can decompress their respective portions in parallel rather than sequentially, thereby saving time. Furthermore, the method 700 transmits all of the compressed data to each of the source drivers, while methods 300 and 500 transmit only the relevant portions of the compressed data to each of the source drivers. As such, the bandwidth needed to transmit the compressed data to the source drivers shown in FIG. 6 is greater than the bandwidth needed to transmit the compressed data from the controller to the source drivers as shown in FIGS. 2 and 4.

The embodiments described above assume that the compressed data is organized by display lines where the first part of the compressed data includes information for updating the uppermost display line in the display from the left to the right. That is, the compressed data for a particular line update is ordered such that the first part of the data is for the leftmost pixel in the line while the last part of the data is for the rightmost pixel in the line. However, this particular ordering of the compressed data is for illustrative purposes only and is not intended to limit the scope of this disclosure. Indeed, the embodiments herein may be used when the data is ordered based on columns rather than lines or when the compressed data starts with the rightmost pixel in a line rather than the leftmost pixel. One of ordinary skill will readily recognize that the embodiments herein can be adapted for any particular ordering of the compressed display data.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the display device). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

We claim:

1. A method, comprising:

saving a first decompression engine state of a controller decompression engine;

storing received compressed data in an input memory of the controller decompression engine;

decompressing the received compressed data using the controller decompression engine to identify a left address of first compressed data in the received compressed data for a first source driver of a display device, the received compressed data including at least a portion of a display frame for the display device, the left address corresponding to a first portion of a display line, where decompression of the first compressed data depends on the first decompression engine state;

saving a second decompression engine state of the controller decompression engine after decompressing the first compressed data;

decompressing the received compressed data using the controller decompression engine to identify a right address of second compressed data in the received compressed data for a second source driver of the display device, the right address corresponding to a second portion of the display line, where decompression of the second compressed data depends on the second decompression engine state;

storing the left address in a left address register and the right address in a right address register;

transmitting a first stream comprising the first compressed data and the first decompression engine state to the first source driver by indexing into the input memory using the left address stored in the left address register to identify the first compressed data;

decompressing the first compressed data by initializing a first decompression engine in the first source driver using the first decompression engine state;

transmitting a second stream comprising the second compressed data and the second decompression engine state to the second source driver by indexing into the input memory using the right address stored in the right address register to identify the second compressed data; and decompressing the second compressed data by initializing a second decompression engine in the second source driver using the second decompression engine state.

2. The method of claim 1, wherein the first source driver updates a different portion of a display screen of the display device than the second source driver.

3. The method of claim 1, wherein the received compressed data is decompressed on a controller having the controller decompression engine, wherein the controller is on a separate chip than the first and second source drivers, the method further comprising:

after saving the first and second decompression engine states, discarding the decompressed data at the controller without transmitting the decompressed data to either the first or the second source driver.

4. The method of claim 1, wherein each of the first stream and the second stream comprises the received compressed data, the method further comprising:

identifying a first location of the first compressed data in the received compressed data and a second location of the second compressed data in the received compressed data; and transmitting the first location to the first source driver and the second location to the second source driver, wherein the first decompression engine state comprises the first location and the second decompression engine state comprises the second location.

5. The method of claim 4, further comprising:

decompressing the first compressed data at the first source driver using the first location and the first decompression engine state, wherein the first source driver receives but does not decompress the second compressed data; and decompressing the second compressed data at the second source driver using the second location and the second decompression engine state, wherein the second source driver receives but does not decompress the first compressed data.

6. The method of claim 1, wherein the first stream does not include the second compressed data and the second stream does not include the first compressed data.

7. The method of claim 6, wherein transmitting the first stream and transmitting the second stream comprises:

storing, at a controller that includes the controller decompression engine, the received compressed data in a first storage element of the input memory corresponding to the first source driver and a second storage element of the input memory corresponding to the second source driver;

transmitting the first compressed data from the first storage element to the first source driver; and transmitting the second compressed data from the second storage element to the second source driver.

8. A timing controller, comprising:

an input memory configured to receive compressed data including at least one display frame for a display device;

a decompression engine configured to:

save a first decompression engine state of the decompression engine;

decompress the received compressed data to identify a left address of first compressed data in the received compressed data corresponding to a first source driver of the display device, the left address corresponding to a first portion of a display line, where decompression of the first compressed data depends on the first decompression engine state;

save a second decompression engine state of the decompression engine after decompressing the first compressed data;

decompress the received compressed data to identify a right address of second compressed data in the received compressed data corresponding to a second source driver of the display device, the right address corresponding to a second portion of the display line, where decompression of the second compressed data depends on the second decompression engine state;

save the left address in a left address register and the right address in a right address register; and control logic configured to transmit a first stream comprising the first compressed data and the first decompression engine state to the first source driver by indexing into the input memory using the left address stored in the left address register to identify the first compressed data and transmit a second stream comprising the second compressed data and the second decompression engine state to the second source driver by indexing into the input memory using the right address stored in the right address register to identify the second compressed data.

9. The timing controller of claim 8, wherein the decompression engine discards the decompressed data without transmitting the decompressed data to either the first or the second source driver after saving the first and second decompression engine states.

10. The timing controller of claim 8, wherein the first decompression engine state is a state of the decompression engine as the decompression engine begins to decompress the first compressed data in the received compressed data and the second decompression engine state is a state of the decompression engine as the decompression engine begins to decompress the second compressed data in the received compressed data.

11. The timing controller of claim 8, wherein the control logic is configured to:

transmit the received compressed data to both the first and second source drivers; and transmit a first location of the first compressed data in the received compressed data to the first source driver and a second location of the second compressed data in the received compressed data to the second source driver.

12. The timing controller of claim 11, wherein the first stream does not include the second compressed data and the second stream does not include first compressed data.

13. The timing controller of claim 12, wherein input memory comprises a first storage element corresponding to the first source driver and a second storage element corresponding to the second source driver, wherein the control logic is configured to:

store the received compressed data in the first storage element and the second storage element, transmit the first compressed data from the first storage element to the first source driver based on the first location, and transmit the second compressed data from the second storage element to the second source driver based on the second location.

14. The timing controller of claim 8, wherein the timing controller is embodied in an integrated circuit, and wherein the first and second source drivers are external to the integrated circuit.

15. A display device, comprising:

first and second source drivers for updating a display screen;

one or more electrical connections; and a timing controller coupled to the first and second source drivers via the one or more electrical connections, the timing controller comprising:

an input memory configured to receive compressed data including at least one display frame for the display device;

a first decompression engine configured to:

save a first decompression engine state of the first decompression engine;

decompress the received compressed data to identify a left address of first compressed data in the received compressed data corresponding to the first source driver of the display device, the left address corresponding to a first portion of a display line, where decompression of the first compressed data depends on the first decompression engine state;

save a second decompression engine state of the first decompression engine after decompressing the first compressed data;

decompress the received compressed data to identify a right address of second compressed data in the received compressed data corresponding to the second source driver of the display device, the right address corresponding to a second portion of the display line, where decompression of the second compressed data depends on the second decompression engine state; and save the left address in a left address register and the right address in a right address register; and control logic configured to transmit a first stream comprising the first compressed data and the first decompression engine state to the first source driver by indexing into the input memory using the left address stored in the left address register to identify the first compressed data and transmit a second stream comprising the second compressed data and the second decompression engine state to the second source driver by indexing into the input memory using the right address stored in the right address register to identify the second compressed data, wherein the first source driver decompresses the first compressed data by initializing a second decompression engine using the first decompression engine state and the second source driver decompresses the second compressed data by initializing a third decompression engine using the second decompression engine state.

16. The display device of claim 15, wherein the first decompression engine discards the decompressed data without transmitting the decompressed data to either the first or the second source driver after saving the first and second decompression engine states.

17. The display device of claim 15, wherein the timing controller is configured to:

transmit the received compressed data to both the first and second source drivers; and transmit a first location of the first compressed data in the received compressed data to the first source driver and a second location of the second compressed data in the received compressed data to the second source driver.

18. The display device of claim 15, wherein the first stream does not include the second compressed data and the second stream does not include first compressed data.

19. The display device of claim 15, wherein the timing controller is disposed on a different substrate than both the first and second source drivers.

20. The display device of claim 15, wherein the timing controller is disposed on a same substrate as both the first and second source drivers.

* * * * *